US012611963B1

(12) United States Patent
Kalnins

(10) Patent No.: US 12,611,963 B1
(45) Date of Patent: Apr. 28, 2026

(54) METHOD AND SYSTEM FOR MONITORING BATTERY RANGE

(71) Applicant: Brunswick Corporation, Mettawa, IL (US)

(72) Inventor: Jared D. Kalnins, Neenah, WI (US)

(73) Assignee: Brunswick Corporation, Mettawa, IL (US)

( * ) Notice: Subject to any disclaimer, the term of this patent is extended or adjusted under 35 U.S.C. 154(b) by 89 days.

(21) Appl. No.: 18/489,280

(22) Filed: Oct. 18, 2023

Related U.S. Application Data

(60) Provisional application No. 63/421,726, filed on Nov. 2, 2022.

(51) Int. Cl.
B60L 58/12 (2019.01)
G01C 21/20 (2006.01)

(52) U.S. Cl.
CPC .............. B60L 58/12 (2019.02); G01C 21/20 (2013.01); *B60L 2200/32* (2013.01); *B60L 2260/52* (2013.01); *B60L 2260/54* (2013.01)

(58) Field of Classification Search
CPC .. B60L 58/12; B60L 2200/32; B60L 2260/52; B60L 2260/54; G01C 21/20
See application file for complete search history.

(56) References Cited

U.S. PATENT DOCUMENTS

| | | | |
|---|---|---|---|
| 6,885,919 B1 | 4/2005 | Wyant et al. | |
| 10,198,005 B2 | 2/2019 | Arbuckle et al. | |
| 10,845,812 B2 | 11/2020 | Ward et al. | |
| 2022/0214171 A1* | 7/2022 | Johnson | B63B 79/40 |
| 2023/0219675 A1 | 7/2023 | Janeczko et al. | |
| 2023/0219676 A1 | 7/2023 | Kalnins et al. | |

* cited by examiner

*Primary Examiner* — Alan D Hutchinson
(74) *Attorney, Agent, or Firm* — Andrus Intellectual Property Law, LLP

(57) ABSTRACT

A method of monitoring battery range for a power storage system powering at least one propulsion device on a marine vessel includes identifying at least one environmental vector describing a magnitude and a direction of an environmental factor impacting the marine vessel, wherein the environmental factor includes at least one of wind or current, determining a path distance and a path direction from a present location of the marine vessel to a trip end location, and calculating a required battery power for the vessel to travel the path distance and the path direction based on the environmental vector. The required battery power is compared to a current battery charge level of the power storage system powering the at least one propulsion device, and then a battery range notice is generated based on a difference between the required battery power and the current battery charge level.

23 Claims, 8 Drawing Sheets

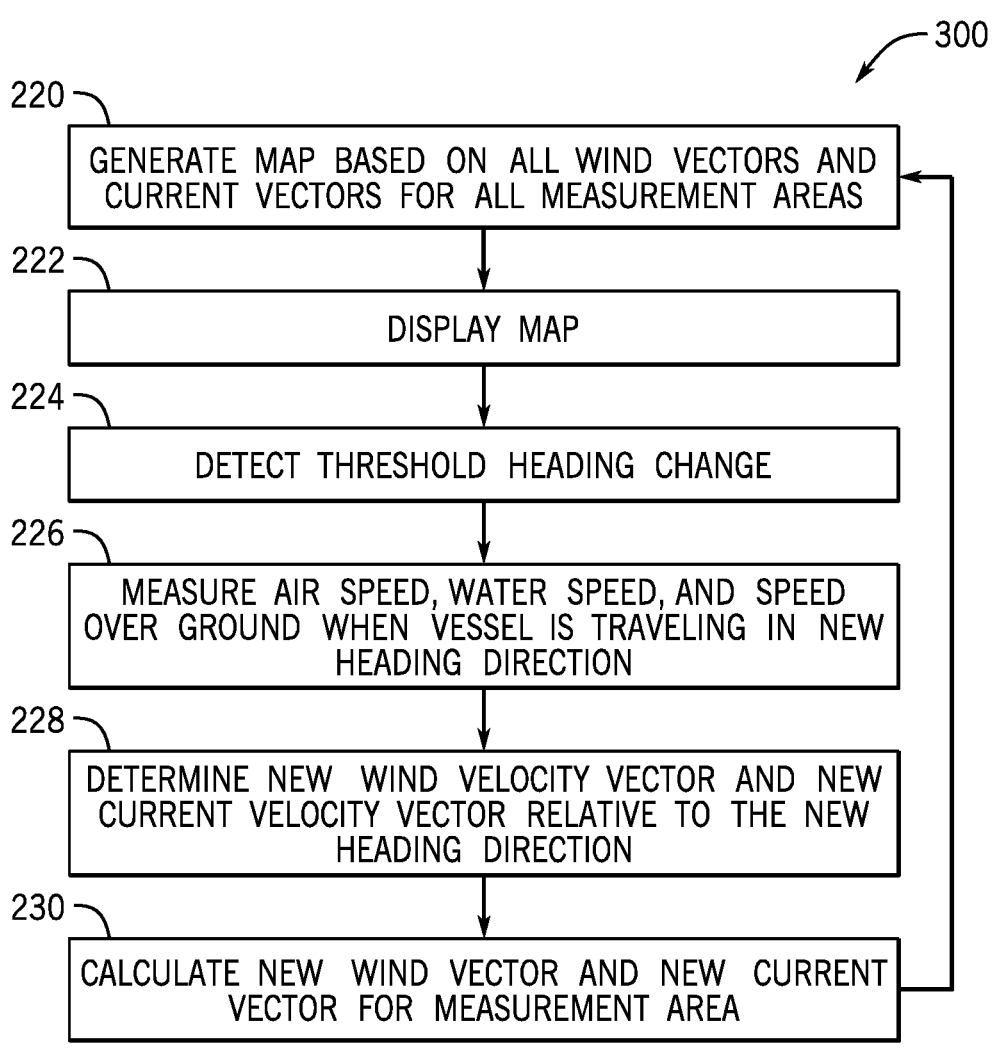

300

220 — GENERATE MAP BASED ON ALL WIND VECTORS AND CURRENT VECTORS FOR ALL MEASUREMENT AREAS

222 — DISPLAY MAP

224 — DETECT THRESHOLD HEADING CHANGE

226 — MEASURE AIR SPEED, WATER SPEED, AND SPEED OVER GROUND WHEN VESSEL IS TRAVELING IN NEW HEADING DIRECTION

228 — DETERMINE NEW WIND VELOCITY VECTOR AND NEW CURRENT VELOCITY VECTOR RELATIVE TO THE NEW HEADING DIRECTION

230 — CALCULATE NEW WIND VECTOR AND NEW CURRENT VECTOR FOR MEASUREMENT AREA

FIG. 5B

METHOD AND SYSTEM FOR MONITORING BATTERY RANGE

CROSS REFERENCE TO RELATED APPLICATION

This application claims benefit of priority to U.S. Provisional Application No. 63/421,726, filed Nov. 2, 2022, the contents of which is hereby incorporated by reference in its entirety.

FIELD

The present disclosure generally relates to systems and methods for monitoring battery range of a power storage system for a marine propulsion system, and more particularly to determining battery range to account for environmental conditions of the marine environment, such as wind and current.

BACKGROUND

The following U.S. patents and applications provide background information and are incorporated herein by reference, in entirety.

U.S. Pat. No. 6,885,919 discloses a process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 10,198,005 discloses a method for controlling movement of a marine vessel that includes controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

U.S. Pat. No. 10,845,812 discloses a system for controlling movement of a marine vessel near an object. The system includes a control module in signal communication with a marine propulsion system, a manually operable input device providing a signal representing a requested translation of the marine vessel, and a sensor providing a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

U.S. Publication No. 2023/0219675 discloses a method of controlling an electric marine propulsion system to propel a marine vessel that includes receiving a user-set time, determining a time remaining based on the user-set time, and identifying a battery charge level of a power storage system on the marine vessel. A required battery power is then determined based on the time remaining and the battery charge level, and then an output limit is determined based on the required battery power to enable propelling the marine vessel for the user-set time without recharging the power storage system. The propulsion system is automatically controlled so as not to exceed the output limit.

U.S. Publication No. 2023/0219676 discloses a method of controlling an electric marine propulsion system configured to propel a marine vessel that includes receiving a user-set distance, identifying a battery charge level of a power storage system on a marine vessel and identifying an energy utilization value. An output limit is then determined based on a remaining distance, the battery charge level, and the energy utilization value. The propulsion system is then automatically controlled so as to not exceed the output limit, enabling the marine vessel to travel the user-set distance without recharging the power storage system.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of monitoring battery range for a power storage system powering at least one propulsion device on a marine vessel includes identifying at least one environmental vector describing a magnitude and direction of an environmental factor impacting the marine vessel, wherein the environmental factor includes at least one of wind or current, determining a path distance and a path direction from a present location of the marine vessel to a trip end location, and calculating a required battery power for the vessel to travel the path distance and the path direction based on the environmental vector. The required battery power is compared to a current battery charge level of the power storage system powering the at least one propulsion device, and then a battery range notice is generated based on a difference between the required battery power and the current battery charge level.

In one embodiment, a marine propulsion system includes a power storage system powering at least one propulsion device on a marine vessel and a control system. The control system is configured to identify at least one environmental vector describing a magnitude and direction of an environmental factor impacting the marine vessel, wherein the environmental factor includes at least one of wind or current, determine a path distance and a path direction from a present location of the marine vessel to a trip end location, and calculate a required battery power for the vessel to travel the path distance and the path direction based on the environmental vector. The control system is further configured to compare the required battery power to a current battery charge level of the power storage system powering the at least one propulsion device, and generate a battery range notice based on a difference between the required battery power and the current battery charge level.

Various other features, objects, and advantages of the invention will be made apparent from the following description taken together with the drawings.

BRIEF DESCRIPTION OF THE DRAWINGS

The present disclosure is described with reference to the following Figures.

FIGS. 5A and 5B are flow charts illustrating one embodiment of a method of monitoring an environment around a marine vessel to identify a wind vector and a current vector according to the present disclosure.

DETAILED DESCRIPTION

Figure 1:
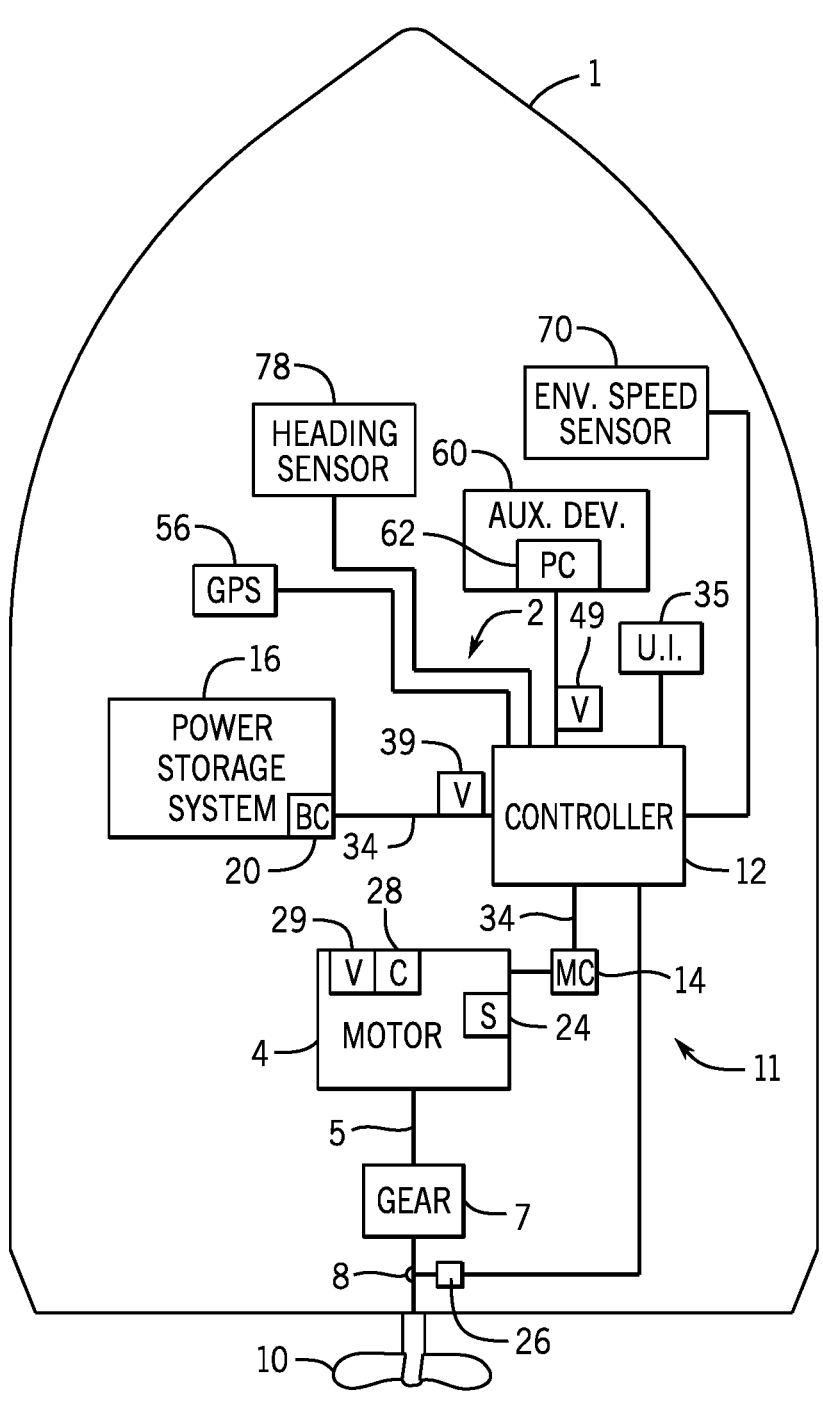
FIG. 1 is a schematic depiction of a marine vessel having an exemplary electric marine propulsion system in accordance with the present disclosure

The inventor has recognized a need for systems and methods that calculate and track environmental conditions around a marine vessel, including wind vectors and water current vectors, using simple speed sensors on the marine vessel, such as a unidirectional wind speed sensor and/or a unidirectional water speed sensor. To provide just a few examples, tracking wind and current directions can be useful for determining and planning optimized routes, calculating optimal propulsion speeds (such as for autonomous control), and predicting energy utilization for traveling certain distances/directions and/or achieving certain speeds.

The inventor has recognized that environmental condition calculation and tracking is particularly needed for electric propulsion, where battery range estimation needs to be improved to account for drag caused by wind and current. Additionally, the inventor recognized that route planning and other trip management functions can be greatly improved by accounting for wind, current, and wave direction, as well as the impact of each those environmental factors on the vessel. The net impact can be determined thereafter. For example, water current is often in a different direction than air current, or wind, and each of wind and current impact the vessel differently. Water current may be a consistent and unidirectional movement of water (such as in the case of a river), or may be due to tides or other periodically changing phenomena, or may be due to or include weather-induced movements such as waves. Thus, the inventor has recognized that, in some embodiments, it is preferable to measure each of wind and water current so that the impact of each can be separately accounted for.

Further, the inventor has recognized that instantaneous power consumption becomes increasingly inaccurate as external environmental forces external forces-such as wind, current, and waves-increase. Drag from wind and/or waves may increase range in one direction and decrease range when the vessel heads a different direction. For example, the amount of battery power required to propel a vessel five miles on a trip out to open water with a predominant tailwind will be significantly less than the amount of power required to get back to shore with a significant headwind. Accordingly, the inventor has devised the disclosed methods to account for the velocity and magnitude of current and or wind to improve accuracy or range determinations.

In view of the foregoing challenges and problems in the relevant art, the inventor developed the disclosed method and system for monitoring battery range for battery powered propulsion on a marine vessel that accounts for drag caused by current and/or wind on the vessel. At least one environmental vector is identified describing a magnitude and direction of an environmental factor impacting the vessel, wherein the environmental factor includes at least one of wind or current. In some embodiments, just a wind vector or just a current vector are used. In other embodiments, both a wind vector and a current vector are utilized. A required battery power for the vessel to travel along a path from the present location of the vessel to a trip end location is then calculated based on the at least on environmental vector, such as a wind vector and/or a current vector. For example, the path distance and the path direction may be determined as the most direct path for the vessel from the present location of the marine vessel to the trip end location. The trip end location may be automatically determined the system as the trip start location—i.e., a round-trip path that ends at the same location as the vessel started—or may be a user-set location.

In one embodiment, a drag of the marine vessel is calculated based on the at least one environmental vector and the required battery power is determined based on the drag. The drag of the marine vessel includes at least one of wind drag, calculated based on an area of the vessel in air, and a current drag, calculated based on an area of the vessel in water.

The required battery power is then compared to a current battery charge level of the battery powering the at least one propulsion device. A battery range notice is then generated based on a difference between the required battery power and the current battery charge level. For example, the battery range notice may display a distance to empty and/or a time to empty for the battery based on current speed parameters of the vessel. Alternatively or additionally, the battery range notice may display a distance to a battery reserve value and/or a time to the battery reserve value based on current speed parameters of the vessel. To provide examples, the current speed parameter may be speed over water of the marine vessel, speed over ground of the marine vessel, motor speed, or motor current.

In some embodiments, a turnaround point for the vessel is determined based on the difference between the required battery power and the current battery charge level, which may also be based on the current speed parameter of the marine vessel. The turnaround point is configured to guide a user on when they need to head directly to the trip end location so as to make it based on the available battery power. Accordingly, the system may be configured to generate an alert advising the user of the turnaround point. For example, when the vessel is within a threshold distance or threshold travel time of the turnaround point (such as within 1 kilometer or within a few minutes of reaching the turnaround point), and the vessel is not heading toward the trip end location, and the system may generate an alert advising the user to turn the vessel toward the trip end location.

In one embodiment, the onboard system is configured to determine a velocity in the environment around a marine vessel by measuring air speed and water speed from the marine vessel in at least two different locations when the vessel is heading in different directions. From that information, as well as based on the vessel's measured speed over ground and heading in each of the at least two different directions, a wind vector can be determined describing the direction and speed of the wind and/or a current vector can be determined describing a direction and vector of the current. The wind vector and/or the current vector are used to calculate the required battery power to account for the drag forces on the vessel traveling on the path distance and path direction.

The wind vector and/or current vector are calculated by normalizing the two velocity vectors into a North/South, East/West coordinate system. For example, the wind vector may be presented as an East Wind value (which may be positive or negative to indicate the wind velocity in the East/West direction) and a North Wind value (which may be positive or negative to indicate the wind velocity in the North/South direction). In various embodiments, just wind speed may be measured and just a wind vector may be calculated, or just water speed may be measured and just a current vector may be calculated, or both wind and water speeds may be measured and both a wind vector and a current vector may be determined.

In one embodiment, air speed and/or a water speed are measured when the marine vessel is at a first location traveling in a first heading direction. The air speed and water speed are each measured with an environmental speed sensor on the marine vessel, where the air speed is measured with an air speed sensor mounted on the marine vessel above the water surface and the water speed is measured with a water speed sensor mounted on the marine vessel below the water surface. A speed over ground of the marine vessel is also measured when the marine vessel is at the first location. The output of the environmental speed sensor(s) and the measured speed over ground are provided to the control system, which is configured to calculate one or more environmental vectors based thereon. A wind velocity relative to the first heading direction can then be determined by subtracting the speed over ground from the measured air speed. Likewise, a current velocity of the water relative to the first heading direction can also be determined by subtracting the speed over ground from the measured water speed.

Once a threshold change in heading direction is made and the marine vessel is heading in a second heading direction, the air speed and/or water speed measurements are reperformed and a second wind velocity and/or second current velocity are determined relative to the second heading direction. Since the first heading direction and the second heading direction are known, a wind vector and/or a current vector can be determined for the area encompassing the first and second locations. The wind vector is calculated based on the first wind velocity and the second wind velocity. Similarly, the current vector is calculated based on the first current velocity and the second current velocity. The wind vector and/or the current vector can then be stored and used to plan or predict a thrust output requirement or an energy output requirement by a marine drive on the marine vessel to propel the marine vessel in a given direction for a given distance. Alternatively or additionally, the wind vector and/ or the current vector may be represented on a display, such as at the helm area of the marine vessel and/or on the user's mobile device.

In another embodiment, the environmental vector(s) are identified based on mapped weather data, such as obtained from the National Weather Service or other aggregator of weather and or water condition information. In such an embodiment, identifying at least one environmental vector includes accessing a map of current vectors and/or wind vectors based on at least a current GPS location of the marine vessel and/or at least one GPS location between the current GPS location and the trip end location.

The wind vector and/or the current vector may be utilized to generate a map of environmental vectors for one or more areas where the vessel has traveled. The disclosed method and system for wind vector and/or current vector calculations may be repeated in a plurality of measurement areas as the vessel moves and changes direction to generate a plurality of corresponding wind vectors and/or current vectors. A map of wind and/or current vectors may then be generated containing the plurality of vectors for the corresponding plurality of areas, thus mapping the wind vectors and/or current vectors for a larger area where the vessel has traveled. This map may then be stored and/or displayed, such as at the helm area of the marine vessel and/or on the user's mobile device, communicated to a computing system remote from the vessel (such as in crowd-sourcing applications), and/or utilized for assessing propulsion system parameter(s) and/or propulsion output requirement(s), such as for assessing on-board energy stores in route planning.

Figure 2:
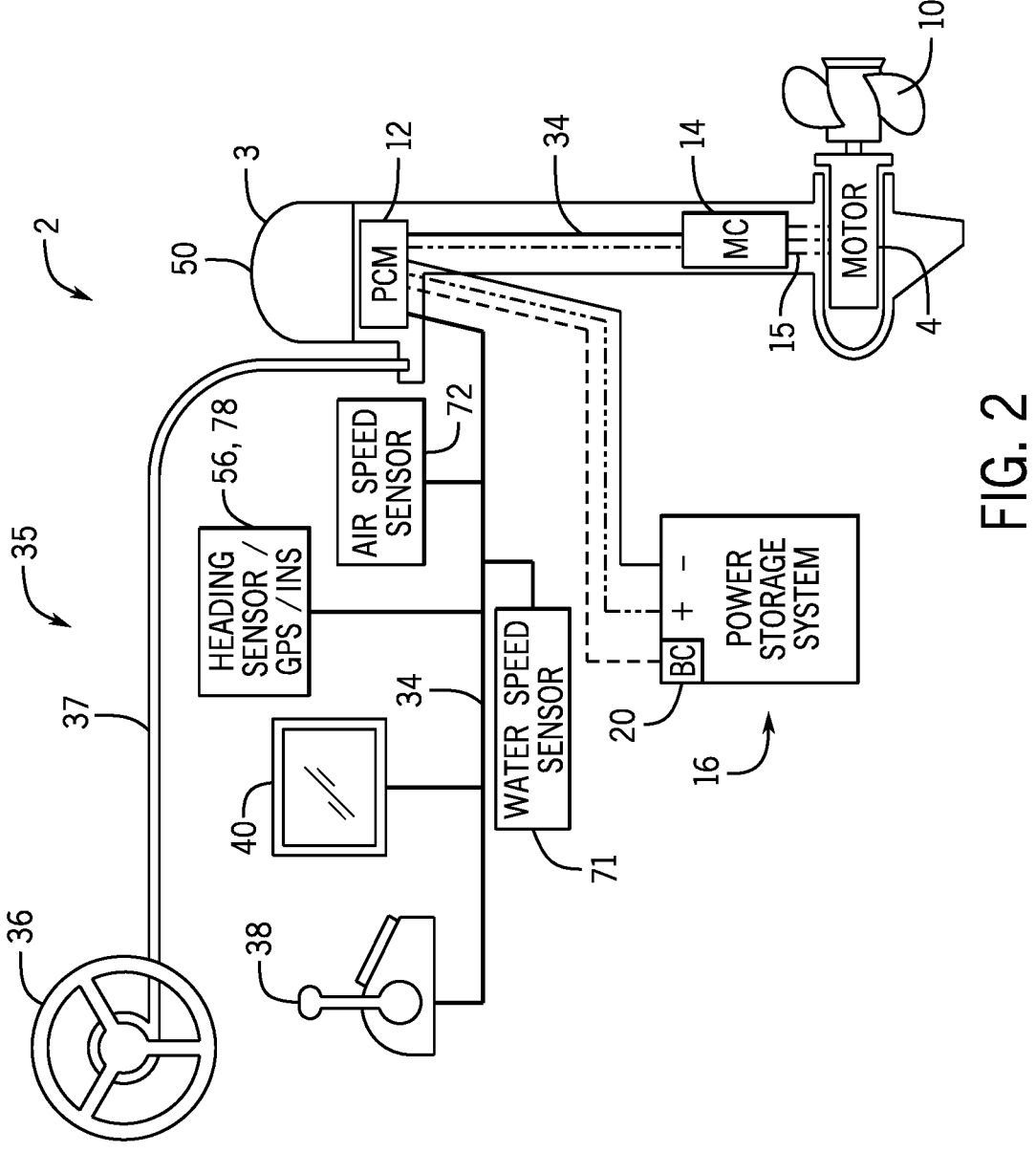
FIG. 2 is a schematic of another exemplary electric marine propulsion system in accordance with the present disclosure.

FIG. 1 depicts an exemplary embodiment of a marine vessel 1 having a marine propulsion system 2 configured to propel the marine vessel. Referring also to FIG. 2, the electric propulsion system 2 includes at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other marine drive 3 configurations, such as inboard drives (as represented in FIG. 1) or stern drives. The electric marine drive 3 is powered by the scalable storage device 16, such as a marine battery or bank of batteries.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4. Various power storage devices and systems are known in the relevant art. The power storage system 16 may be a battery system configured to receive one or more batteries or banks of batteries of different varieties including OEM batteries, third party batteries, or both. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

A control system 11 controls the electric marine propulsion system 2, wherein the control system 11 may include a plurality of control devices, or controllers, configured to cooperate to provide the method of controlling the electric marine propulsion system described herein. For example, the control system 11 may include a central controller 12, and one or more motor controllers, trim controllers, steering controllers, battery controllers, power controllers, navigation controllers, etc. communicatively connected, such as by a communication bus or other communication link. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and/or tracking operation of the electric propulsion system 2. The memory may include volatile and/or non-volatile systems and may include removable and/or non-removable media implemented in any method or technology for storing information. The storage media may include non-transitory and/or transitory storage media, including random access memory, read only memory, or any other medium which can be used to store information and be accessed by an instruction execution system, for example. Such information may include a command table containing a set of adjustment commands based on measured or calculated values. An input/output (I/O) system facilitates communication between the control system 11 and connected devices, including facilitating communication of the environmental speed measurements by the environmental speed sensor(s) 70, 71.

Each electric motor 4 may be associated with a motor controller 14 configured to control power to the electric motor, such as to the stator winding thereof. The motor controller 14 is configured to control the function and output of the electric motor 4, such as controlling the torque outputted by the motor 4, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

In certain embodiments, various sensing devices 24, 26, 28, 29, 39, 49 may be configured to communicate with a local controller, such as the motor controller 14 or power controller 62 and/or other controllers in the control system 11. In other embodiments the sensors 24, 26, 28, 29, 39, 49 may communicate with the central controller 12 and the motor controller 14 may be eliminated. The system includes a vessel sensing system comprising one or more sensors or measurement systems configured to measure a speed over ground of the marine vessel and a heading direction of the vessel and provide such information to the control system 11. A GPS system 56 may also be configured to determine a current global position of the vessel, track vessel position over time, determine vessel speed over ground, and/or determine the vessels' direction of travel, or heading direction, and to provide such information to the controller 12 and/or other controllers in the control system 11. Alternatively, instead of a GPS system 56, the vessel may include a global navigation satellite system (GNSS), or a GNSS/INS (inertial navigation system) configured to measure vessel speed over ground and/or heading direction of the vessel. Alternatively or additionally, the vessel 1 may be equipped with a heading sensor 78 configured to measure the vessels' heading. The vessel heading sensor 78 may include a compass, a gyroscope, an accelerometer, and/or other elements configured to measure vessel position and/or movement. For example, the heading sensor may be part of an inertial measurement unit (IMU) or similar, such as IMU having a solid state, rate gyro electronic compass that detects the direction of the earth's magnetic field using solid state magnetometers and indicates the vessel heading relative to magnetic north.

Additionally, one or more environmental sensors 70 are configured to measure air and/or water speed around the marine vessel and such information may be provided to the controller 12. Referring also to FIG. 2, the environmental sensors include a water speed sensor 71 and an air speed sensor 72. The water speed sensor 71 may be a unidirectional sensor, such as a pitot tube or a paddle wheel, mounted to the hull under the waterline and configured to measure water speed in the direction of travel of the vessel and with respect to the vessel's hull, and thus to measure the vessel's speed-over-water. Similarly, the air speed sensor 72 may be a unidirectional sensor, such as a pitot tube or a paddle wheel, mounted to the vessel above the waterline, such as at a location at or near the highest point on the vessel that will not be protected or obstructed from measuring the air flow over the vessel. The air speed sensor 72 may be configured to measure air speed in the direction of travel of the vessel and with respect to the vessel, and thus to measure the vessel's speed-through-air.

In some embodiments, a plurality of air speed sensors 72 may be located at different locations on the marine vessel 1, wherein each is configured to measure air speed at its respective location. For example, one air speed sensor may be located at or near the front of the bow and a second air speed sensor may be located at or near the highest point on the marine vessel, such as atop the Bimini top or on the antennae tower. An aggregate airspeed value can then be determined based on the plurality of local measurements on the vessel, such as by averaging the plurality of local measurements or using other calculation techniques to determine a filtered airspeed value that is less influenced by local air disturbances, measurement error, etc. Similarly, an aggregate water speed value may be determined based on measurements from a plurality of water speed sensors 71 mounted at different locations on the vessel hull below the waterline.

Controllers 12 and 14 (and or the various sensors and systems) may be configured to communicate via a common communication link 34. The one or more communication links may be a wired link, such as a bus, or may be a wireless communication link, such as via any wireless protocol. In one embodiment, the communication link 34 is a CAN bus (e.g., configured as a CAN Kingdom Network), or alternatively may be a LIN bus. In some embodiments, one or more devices may be connected by dedicated communication link, such as a dedicated communication bus or link between controllers 12 and 14.

Sensors may be configured to sense the power, including the current and voltage, delivered to the motor 4 and/or voltage sensed at other locations within the system. For example, a plurality of voltage sensors 29, 39, 49 may be configured to sense voltage at various locations within the system. Voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4 and ensuring the system 2 is operating within the capabilities of the electric motor 4. Alternatively or additionally, the system 2 may include a voltage sensor 39 at or near the connection point of the vessel system(s) to the power storage system 16 to sense the voltage at the location(s) of power input. Alternatively or additionally, a voltage sensor 49, or multiple voltage sensors, may be located to measure voltage powering one or more auxiliary devices 60. In certain embodiments, the voltage sensor 49 may comprise part of the power controller 62 for the auxiliary power system and/or may be configured to measure voltage at one or more converters, such as a DC-DC converter powering auxiliary electronics or other auxiliary devices.

In the depicted example, the current sensor 28 and voltage sensor 29 may be communicatively connected to the motor controller 14 to provide measurement of the voltage supplied to the motor and current supplied to the motor. Other voltage sensor(s) 39, 49 may be configured to provide voltage measurement outputs to the controller 12 and/or the motor controller 14. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, voltage sensor 28, and current sensor 29 may be integrated into a housing of the electric motor 4, and in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a speed sensor 24 configured to measure a rotational speed of the motor 4 (motor RPM). Alternatively or additionally, propeller speed sensor 26 may be configured to measure a rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

At least one battery controller 20 is configured to monitor the power storage system 16. For example, the battery or each of a plurality of batteries in the power storage system 16 may have an associated a battery controller 20 configured to monitor various battery parameters, such as current, voltage, temperature, etc. and communicate those parameters within the control system, such as to the central controller 12 and/or the motor controller 14. For instance, each battery controller may be configured to periodically determine and communicate via the communication link 34 each of a charge level for the battery (e.g., battery state of charge and/or battery voltage), battery temperature, and battery state of health for each of its associated batteries, battery connection and operation status, as well as other parameters and operation information for the battery.

The central controller 12, which in the embodiment shown in FIG. 2 is a propulsion control module (PCM), communicates with the motor controller 14 and the battery controller 20 via communication link 34, such as a CAN bus. The controller also receives input from and/or communicates with one or more user interface devices in the user interface system 35 via the communication link, which in some embodiments may be the same communication link as utilized for communication between the controllers 12 and 14 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. Alternatively or additionally, the user interface devices may include a user's mobile device, such as a cell phone or other portable computing device running an application, such as VesselView Mobile™ configured to communicate with one or more controllers in the control system 11. A steering wheel 36 is provided, which in some embodiments may communicate with the controller 12 or other control device in the control system 11 to effectuate steering control over the marine drive 3, which is well-known and typically referred to as a steer-by-wire arrangement. Alternatively, as in the depicted embodiment, the steering wheel 36 is a wired steering arrangement where the steering wheel 36 is connected to a steering actuator that steers the marine drive 3 by a steering cable 37. Other steering arrangements, such as various wired and steer-by-wire arrangements, are well-known in the art and could alternatively be implemented.

The various parameters of the electric propulsion system are utilized for providing user-controlled or automatically effectuated vessel power control functionality appropriate for optimizing power usage. The system may be configured to control power usage by the electric propulsion system 2, for example so that power available and utilized to effectuate propulsion remains within calculated limits to provide consistent propulsion and operate the motors within the rated operation parameters. The system may be configured to operate in a variety of user-selectable power modes, or in various power modes that may be automatically selected by the control system 11 based on sensed parameters and/or operating conditions of the propulsion system 2.

The power storage system 16 may further be configured to power auxiliary devices 60 on the marine vessel 1 that are not part of the propulsion system 2. For example, the auxiliary devices may include a bilge pump, cabin lights, a stereo system or other entertainment devices on the vessel, a water heater, a refrigerator, an air conditioner or other climate/comfort control devices on the vessel, communication systems, navigation systems, or the like. Some or all these accessory devices are sometimes referred to as a "house load" and may consume a substantial amount of battery power. Additionally, other non-motor loads may be powered by the power storage system 16, such as steering, motor trim, trim tabs, and other devices relating to steering and/or vessel orientation control.

The power consumption by some or all of the auxiliary devices and/or non-motor loads may be monitored and/or controllable, such as by a power controller 62 associated with each controlled auxiliary device or a group of auxiliary devices (FIG. 1). The power controller 62 is communicatively connected to the controller 12 or is otherwise communicating with one or more controllers in the control system 11, in order to monitor and/or control power consumption by such auxiliary devices. For example, the power controller 62 may be configured to communicate with one or more power monitoring or other control devices via CAN bus or LIN bus, and to then control operation of the auxiliary device and/or power delivery to the auxiliary device according to received instructions. For instance, the system may be configured to reduce power delivery or prevent change in power deliver to the device(s) 60 during certain measurement periods, or to selectively turn off the auxiliary device(s) 60 by turning on or off power delivery to the device(s) 60 associated with the power controller 62 during the measurement period. For example, the power controller 62 for one or a set of auxiliary devices may include a battery switch controlling power thereto. The control system 11 may thus include digital switching system configured to control power to the various auxiliary devices, such as a CZone Control and Monitoring system by Power Products, LLC of Menomonee Falls, WI. Other examples of power control arrangements are further exemplified and described at U.S. application Ser. Nos. 17/009,412 and 16/923,866, which are each incorporated herein by reference in its entirety.

As described above, the disclosed method and system are configured to monitor battery range based on environmental conditions, such as wind and current directions and magnitudes. In certain embodiments, the control system 11 may be equipped and configured to measure wind and current speeds (such as the system exemplified in FIG. 1) and determine one or more of the environmental vectors internally. Alternatively, the control system 11 may be configured to access the wind and/or current vector information externally, such as to access weather map data based on GPS information of the vessel and/or the vessel's travel path to the trip end location.

Figure 3:
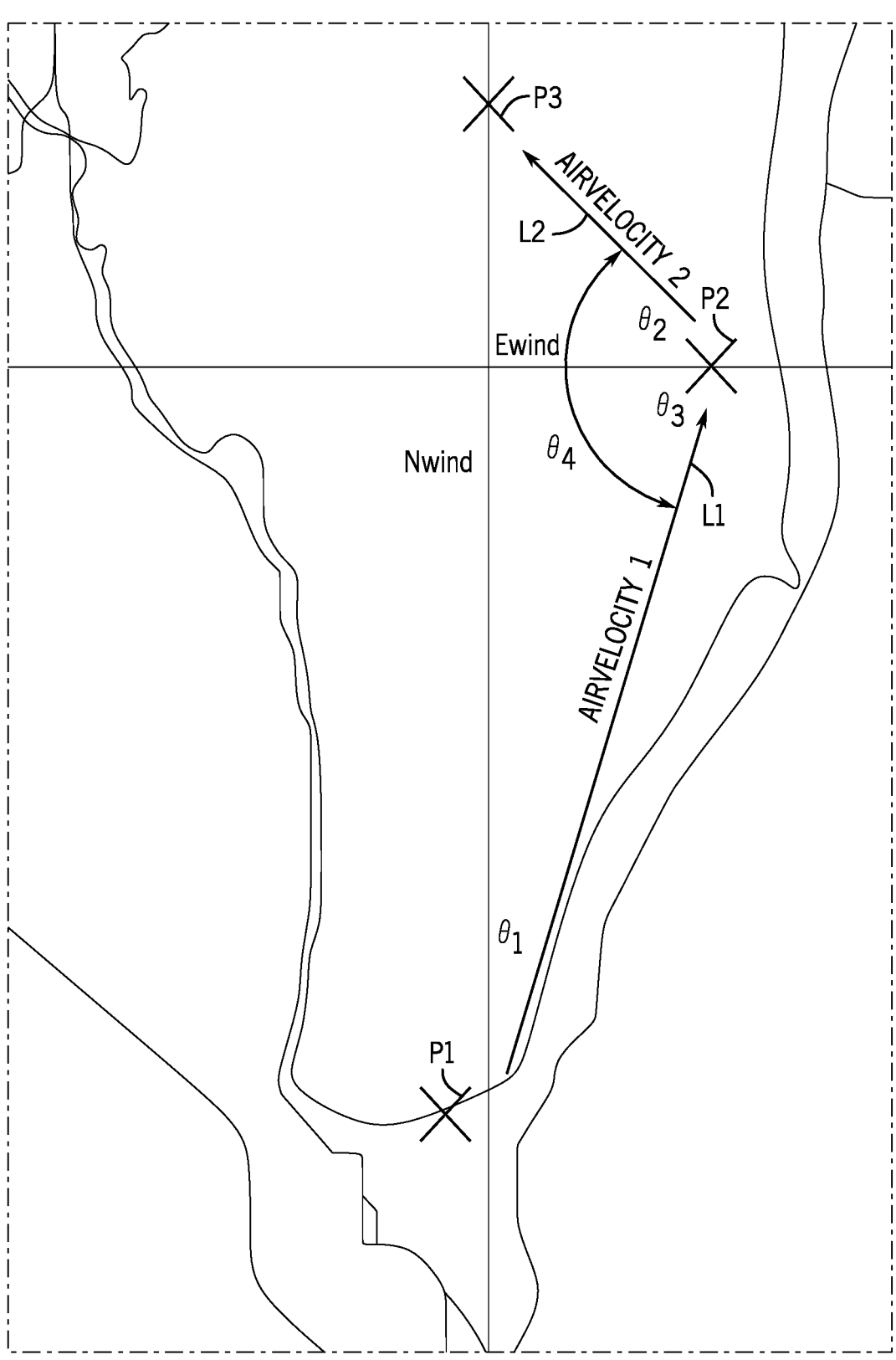
FIGS. 3 and 4 illustrate exemplary scenarios for calculating wind vectors and/or current vectors according to the present disclosure.

In one example, the system is configured sense the wind and/or current speeds in environment around the marine vessel and to determine wind and/or current vectors for one or more areas that the vessel occupies. FIG. 3 illustrates an exemplary scenario illustrating a vessel travel path between a start location and a present location of the vessel—e.g., between location P1 and location P3 when the vessel is at location P3—which is in a known heading direction (e.g., measured by heading sensor 78 and/or determined based on GPS information). Air speed and/or water speed are measured by environmental speed sensors 71 and 72 along a first leg L1 between the start location P1 and a second location P2. For each air and/or water speed measurement, a corresponding speed over ground is determined for the marine vessel by a vessel speed sensor, such as by the GPS system 56 and/or based on GPS information therefrom. The speed over ground is subtracted from each air speed and water speed measurement to isolate a wind velocity and/or a current velocity for each measurement. Each wind velocity and/or a current velocity are then stored in association with, or relative to, the current heading direction of the marine vessel when the measurement was made.

At point P2, the vessel turns, changing heading direction by at least a threshold amount. Air speed and/or water speed are again measured by environmental speed sensors 71 and 72 along the second leg L2 between the second location P2 and a third location P3. Wind velocity and/or a current velocity are then determined for each air and/or water speed measurement by subtracting the corresponding speed over ground measurement.

A wind vector and/or a current vector are then calculated based on the corresponding first and second velocity values. The wind vector describes a magnitude and a direction of the wind and the current vector describes a magnitude and a direction of the current. The first and second velocity values are measured at known headings separated by a known angle, illustrated as θ4 in FIG. 3. The heading direction of the first leg L1 and the heading direction of the second leg L2 must be sufficiently different such that differences in the wind and current can be reliably measured and sufficiently unaffected by measurement error. Thus, a threshold change in heading direction is required between the heading when the first velocity value is measured and the heading when the second velocity value is measured. To provide just one example, the threshold change in heading direction required between the first and second heading directions of the first and second legs L1 and L2 may be 10 degrees. However, the system 11 may be configured to implement smaller or lager thresholds, such as based on the resolution of the environmental speed sensor 71, 72, their placement, the number of speed sensors 71, 72 being used, etc. The control system 11 may be configured to wait for the threshold heading change to occur or to request that the user to temporarily change the heading by the threshold amount. Alternatively, where an autonomous navigation controller is implemented, the navigation controller may temporarily implement the heading change to perform the measurement.

In some embodiments, an aggregate wind velocity and/or an aggregate current velocity may be determined for each of the legs L1 and L2 and the wind and/or current vectors may be calculated based on the aggregate velocity values. For example, a first aggregate wind velocity and/or first aggregate current velocity may be determined the first leg L1, or a portion thereof, based on multiple wind velocity and/or current velocity calculations at locations along the leg L1 or portion of the leg L1. Similarly, a second aggregate wind velocity and/or second aggregate current velocity may be determined for the second leg L2, or a portion thereof, based on multiple wind velocity and/or current velocity calculations at locations along the leg L2 or portion of the leg L2. For example, the control system 11 may be configured to periodically measure one or both of wind and/or water speed, and thus to determine the wind velocity and/or current velocity at the same frequency. The multiple wind velocity and/or current velocity values determined along a leg where the vessel is traveling straight in a consistent heading direction (e.g., leg L1 or leg L2) may be averaged or filtered or otherwise utilized together to determine an aggregate wind velocity and/or aggregate current velocity for the leg L1, L2 or for a portion of the leg.

The area for which the wind vector and/or a current vector are calculated to represent is based on the locations at which the wind speed and/or water speed are measured. Where the velocity values are based on a single speed measurement at a single measurement location in each heading direction, the area for which the wind and current vectors are calculated is defined by the two measurement locations. Where aggregate values are used, and thus the velocity values are based on multiple speed measurements taken at multiple locations, the area the area for which the wind and current vectors are calculated is defined by all of the measurement locations.

Figure 4:
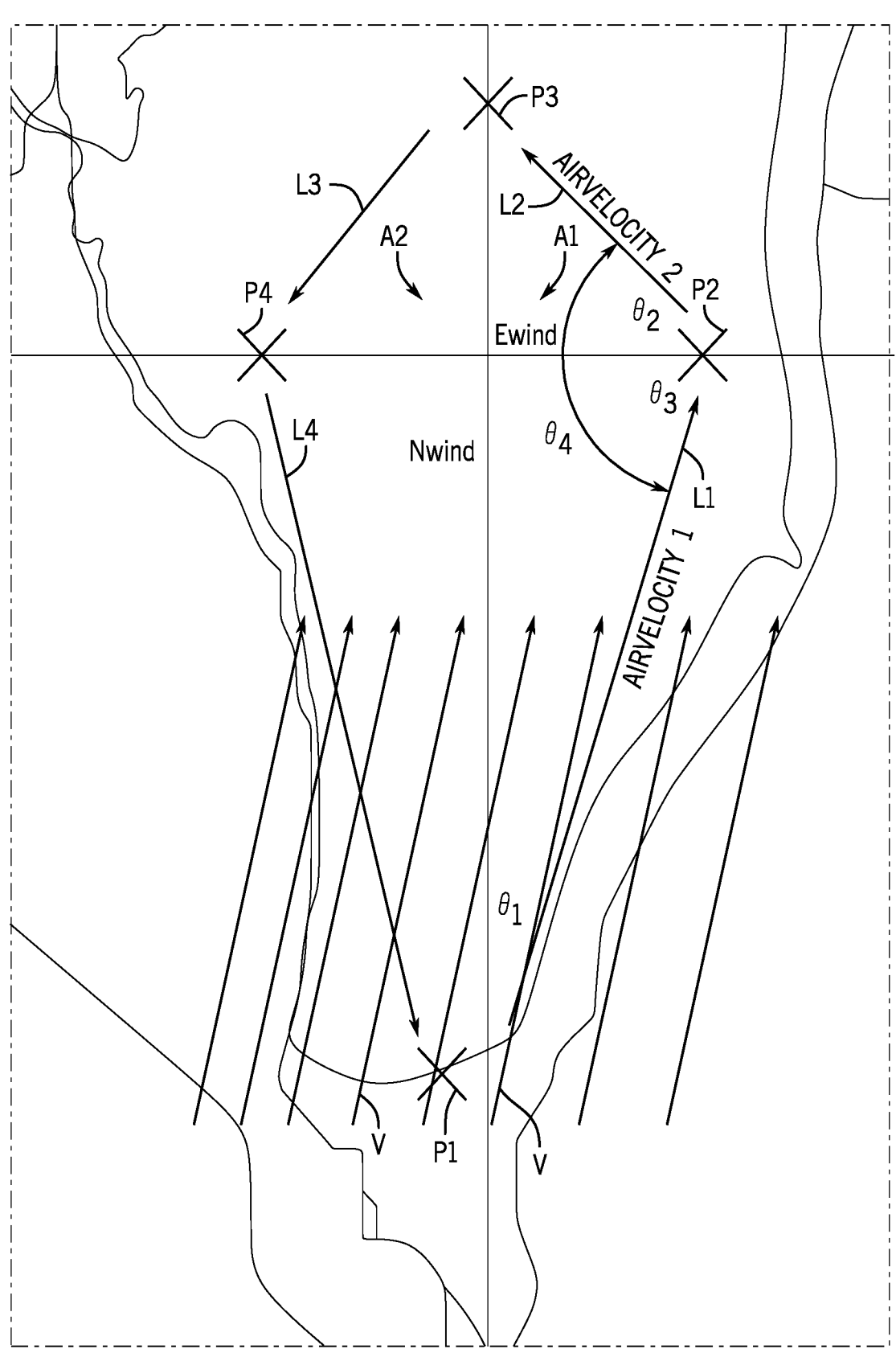

In some implementations, the disclosed method and system for wind vector and/or current vector calculations may be repeated in a plurality of measurement areas to generate a plurality of corresponding wind vectors and/or current vectors. A map of wind and/or current vectors may then be generated containing the plurality of vectors for the corresponding plurality of areas, thus mapping the wind vectors and/or current vectors for a larger area where the vessel has traveled and through which the vessel may be making a return trip. For example, FIG. 4 illustrates a map showing two measurement areas A1 and A2 defined based on the measurement locations, which could be one or more locations along each of the legs L1-L4 (which in this example complete a path back to the start location P1 but in other embodiments may be an open path with a different start and stop location). Wind vectors V are calculated for the first area A1 based on one or more measurements in the first measurement leg L1 and the second measurement leg L2. Wind vectors V are calculated for the second area A2 based on one or more measurements in the third measurement leg L3 and the fourth measurement leg L4.

Alternatively or additionally, the control system may be configured to communicate the map of vectors, such as via long range wireless communication networks such as cellular or satellite networks, or by radio communication, to a central receiver. Thereby, map vectors created by multiple different vessels can be aggregated together to cover a larger area and such maps may be communicated to or accessible by one or more devices operating with the control system 11, such as via a user's mobile device or an onboard management system.

In one embodiment, the wind vector and/or a current vector are calculated based on air speed, water speed, and speed over ground measurements according to the following equations. The calculation of a wind vector based on wind speed measurements is exemplified; however, the same equations apply equally to the calculation of a current vector based on current speed measurements.

A first wind velocity vector (AirVelocity1) is calculated based on a first measured air speed and a first speed over ground when the vessel is heading in a first heading direction. And then, once the vessel turns off of its initial heading by a threshold change in heading direction, the speed over ground and air speed are recorded again and a second wind velocity vector (AirVelocity2) is calculated. AirVelocity1 and AirVelocity2 are calculated as follows:

AirVelocity1=SensedAirSpeed1−SpeedOverGround1

AirVelocity2=SensedAirSpeed2−SpeedOverGround2

The two velocity vectors are then normalized into a North/South, East/West coordinate system. Using trigonometry from the wind speed vectors we can solve for each of a North wind value ("NWind," which may be positive or negative to indicate the wind velocity in the North/South direction) and an East wind value ("EWind," which may be positive or negative to indicate the wind velocity in the East/West direction) as follows:

$$\sin \theta 1 = \frac{EW\ ind}{AirVelocity1} \quad \cos \theta 2 = \frac{EW\ ind}{AirVelocity2}$$

$$\theta 4 (calc \text{ from } GPS) = \theta 2 + \theta 3 \quad \theta 3 = \pi - \frac{\pi}{2} - \theta 1$$

$$\theta 1 = \frac{\pi}{2} - \theta 4 + \theta 2$$

$$AirVelocity1 * \sin\left(\frac{\pi}{2} - \theta 4 + \theta 2\right) = EWind$$

$$AirVelocity2 * \cos(\theta 2) = EWind$$

$$AirVelocity2 * \cos(\theta 2) = AirVelocity1 * \sin\left(\frac{\pi}{2} - \theta 4 + \theta 2\right)$$

$$AirVelocity2 * \cos(\theta 2) = AirVelocity1 * \sin\left(\frac{\pi}{2} - \theta 4 + \theta 2\right)$$

$$AirVelocity2 * \sin\left(\frac{\pi}{2} + \theta 2\right) = AirVelocity1 * \sin\left(\frac{\pi}{2} - \theta 4 + \theta 2\right)$$

$$\frac{AirVelocity2}{AirVelocity1} = \frac{\sin\left(\frac{\pi}{2} - \theta 4 + \theta 2\right)}{\sin\left(\frac{\pi}{2} + \theta 2\right)}$$

$$\sin^{-1}\left(\frac{AirVelocity2}{AirVelocity1}\right) = \frac{\frac{\pi}{2} - \theta 4 + \theta 2}{\frac{\pi}{2} + \theta 2}$$

$$\frac{\pi}{2} + \theta 2 = \frac{\frac{\pi}{2} - \theta 4 + \theta 2}{\sin^{-1}\left(\frac{AirVelocity2}{AirVelocity1}\right)}$$

$$\frac{\pi}{2} + \theta 2 = \frac{\frac{\pi}{2} - \theta 4 + \theta 2}{\sin^{-1}\left(\frac{AirVelocity2}{AirVelocity1}\right)}$$

$$\theta 2 - \frac{\theta 2}{\sin^{-1}\left(\frac{AirVelocity2}{AirVelocity1}\right)} = \frac{\frac{\pi}{2} - \theta 4}{\sin^{-1}\left(\frac{AirVelocity2}{AirVelocity1}\right)} - \frac{\pi}{2}$$

$$EWind = \frac{\cos\theta 2}{AirVelocity2}$$

$$NWind = \frac{\sin\theta 2}{AirVelocity2}$$

Figure 5A:
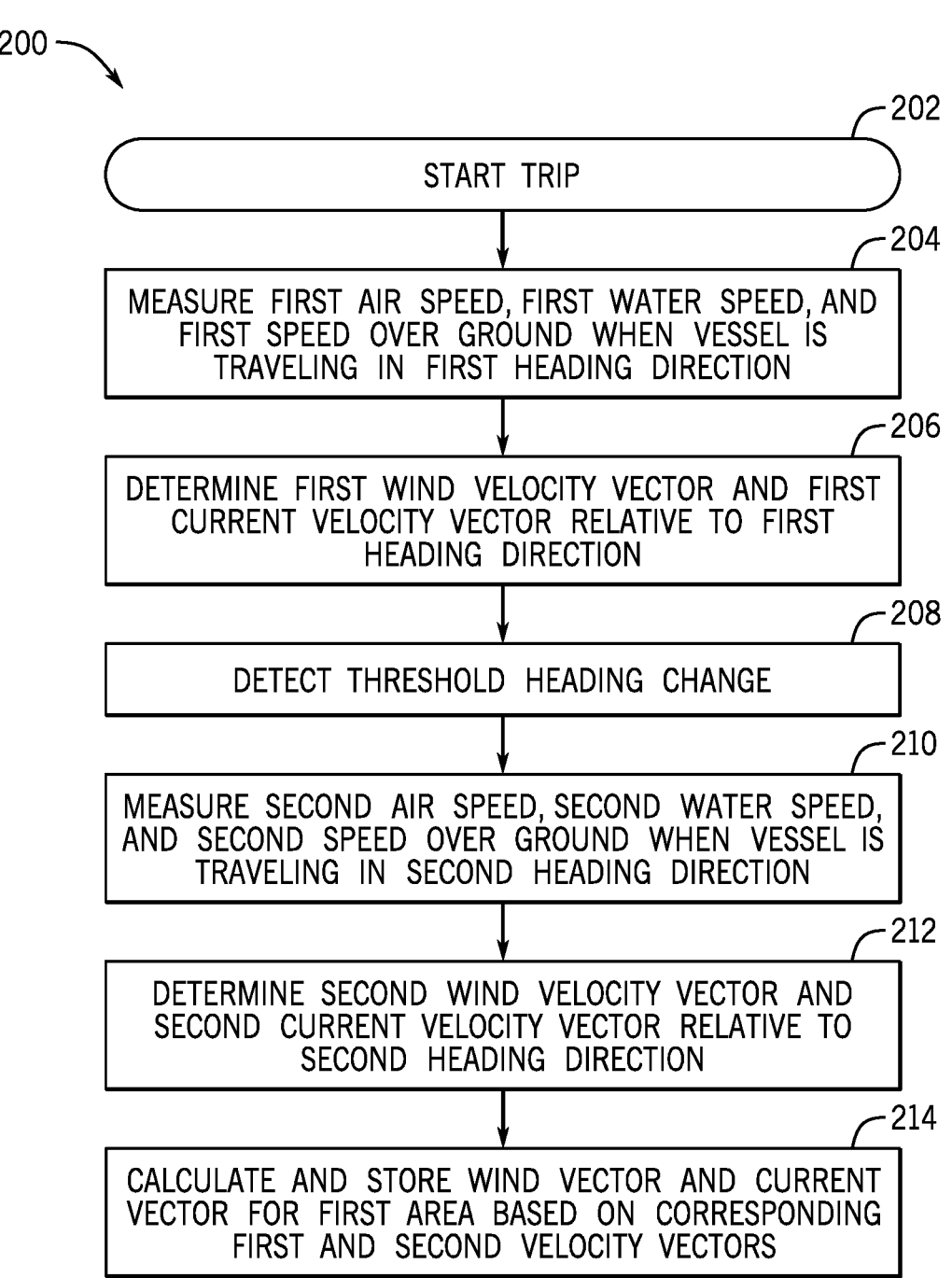

FIG. 5A depicts one embodiment of a method 200 of monitoring an environment around a marine vessel by calculating wind and current vectors. As described above, in some embodiments, just one of wind or current may be monitored and corresponding vector calculation performed. However, in FIG. 5 both wind and water speed are measured and thus both wind and current vectors are calculated. The trip is started at step 202. The system may be configured to trigger a trip start based on various indicators, such as first key up of at least one marine drive after a predetermined period of inactivity or upon user input to start a trip. A first air speed, a first water speed, and a first speed over ground are measured at step 204. For example, the first measurements may be performed at or near the location of startup, such as within a threshold distance of a start location of the trip. A first wind velocity vector and a first current velocity vector are then determined for the first heading direction at step 206 based on the speed measurements, such as by the calculation methods illustrated above. In some embodiments, wind and current vectors may be periodically determined as the vessel continues traveling in the first heading direction and aggregate first wind and current vectors may be determined for the first leg where the vessel was continually heading in the first direction.

The vessel heading is monitored to detect when a threshold change in vessel heading occurs. Once the threshold heading change is detected at step 208, second air speed, water speed, and speed over ground measurements are taken at step 210 as the vessel travels in the second heading direction. The system may be configured to determine that the vessel is traveling at a fixed heading (rather than in a turn) prior to taking the second measurements to avoid measurement error caused by the effects of the vessel turn dynamics. For example, the control system may be configured to determine that the second heading direction is maintained for a threshold time or a threshold distance before measuring the second air speed and/or the second water speed. A second wind velocity vector and a second current velocity vector are then determined for the second heading direction at step 212 based on the speed measurements, such as by the calculation methods illustrated above. In some embodiments, wind and current vectors may be periodically determined as the vessel continues traveling in the second heading direction and aggregate second wind and current vectors may be determined for the second leg where the vessel was continually heading in the second direction.

The wind vector and the current vector are then calculated for the area defined by the first and second measurement locations or the first and second legs for which aggregate measurements were determined. The wind vector and the current vector are determined based on the corresponding first and second velocity vectors and the first and second heading directions, such as by the calculation methods illustrated above. A wind and/or current map may then be generated containing the wind and/or current vector for the area. In some embodiments, a plurality of wind and/or current vectors are calculated for each of a plurality of areas and a map of the plurality of wind and/or current vectors is generated covering the plurality of areas. In some embodiments, interpolation can be utilized to bridge gaps between measurement areas to generate a cohesive map covering a larger area.

FIG. 5B depicts another embodiment of a method 300 of monitoring an environment around a marine vessel by calculating wind and current vectors that includes generating and displaying a map providing a visual representation of the environmental vectors thus showing the wind and/or current vectors calculated for the area(s) where the vessel has traveled. At step 220, the control system is configured to generate a map based on all wind vectors and all current vectors for the area(s) where the environmental vectors have been calculated by the system. For example, the wind and current vectors may be generated by the methods described in FIG. 5A. The map is displayed at step 222, such as on a display device 40 at the helm, on a user's mobile device via an application communicating with the control system, or on some other display device visible to the operator or other user of the vessel. Once a threshold heading change is detected at step 224, air speed, water speed, and speed over ground are measured at step 226 while the vessel is heading in a new heading direction, as is described herein. A wind velocity vector and/or a current velocity vector are then determined at step 228 for the new heading direction. At step 230, a wind vector and/or a current vector are calculated for the new measurement area. The map is then updated and stored at step 230 such that the environmental vectors, wind and or water, around the vessel can be monitored as the vessel moves through various marine areas. Such information can then be utilized by the control system for monitoring and controlling aspects of the propulsion system, as well as displayed and or communicated to provide users with information about the environment.

Where vector maps are generated, they can be used to calculate the direction-based battery range for a vessel. A battery range notice can then be generated advising a user of the battery range in one or multiple directions. In certain embodiments, the control system 11 may be configured to continually or periodically calculate a required battery power to get the vessel from the current location to the trip end location. For example, by default the trip end location may be automatically set to the start location of the trip, and thus the system is configured to regularly calculate and monitor the battery power required to get the vessel back home. Alternatively, the trip end location may be set, such as based on user input, to a specified GPS location and the control system 11 monitors the battery power required to get the vessel to the user-set destination. The required battery power is calculated based on the environmental vector, such as to account for the wind drag and/or the water drag, on the vessel when it is heading from the vessel's present location toward the trip end location. Thereby, an accurate battery range is determined that accounts for environmental factors such as wind and current. The required battery power is monitored against the current battery charge level and an assessment is made to determine whether the current battery charge level is sufficiently greater than the required battery power-thus, whether the power storage system has sufficient charge level to get the vessel to the trip end location.

The required battery power calculation accounts for all known environmental vectors, such as any wind vectors and/or current vectors along the path between the vessel's present location and the trip end location. Referring to the example scenario illustrated in FIG. 4, assuming that the trip end location is the start location P1, the control system 11 may be configured to periodically calculate the required battery power to return the vessel from its present GPS location (wherever the vessel is along legs L1, L2, L3 or L4) to location P1. For example, the path distance and path direction to P1 may be periodically determined at regular time intervals or distance intervals as the most direct path for the vessel from the present GPS location of the marine vessel to P1, which is set as the trip end location.

The required battery power accounts for the wind vector V, as well as any current vectors that are calculated or obtained by the control system 11. Additionally, the required battery power may be determined based on a current speed parameter of the vessel, thus assuming that the vessel maintains its current speed as it travels to the trip end location. The current speed parameter may be any parameter describing vessel speed, motor speed, or power being consumed by the propulsion motor, including speed over water of the marine vessel, a speed over ground of the marine vessel, a motor speed, or a motor current.

The required battery power is compared to the current battery charge level of the power storage system 16. The control system may be configured to help a user plan the trip so that sufficient battery power is reserved, and thus to generate a battery range notice based on a difference between the required battery power and the current battery charge level. For example, the control system 11 may be configured to determine a turnaround point for the vessel based on the difference between the required battery power and the current battery charge level and to advise a user of the location of the turnaround point relative to the vessel's present location. For example, the turnaround point may be calculated based on the current vessel heading and the current speed parameter, thus assuming that the vessel's current heading and speed parameter are maintained up to the turnaround point and that the vessel speed is maintained for the entire trip to the end location. In one embodiment, the trip end location is determined as the GPS location in the vessel's current heading direction where the required battery power is a threshold less than the current battery charge level.

Figure 6:
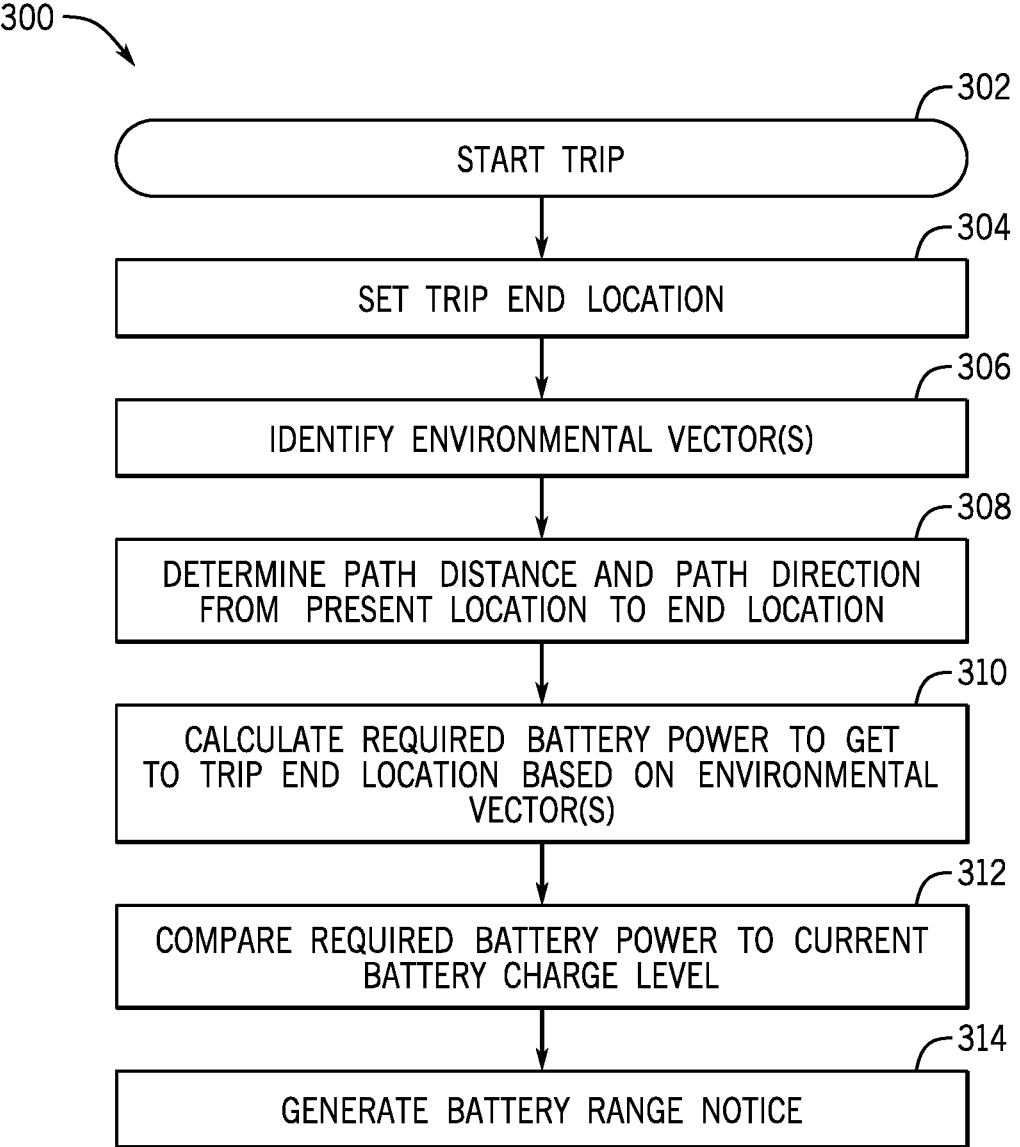
FIG. 6 is a flow chart illustrating one embodiment of a method of monitoring battery range for electric-powered marine propulsion.

FIG. 6 is a flow chart illustrating a method 300 of monitoring battery range for battery-powered electric propulsion on a marine vessel. The trip is started at step 302. The system may be configured to trigger a trip start based on various indicators, such as first key up of at least one marine drive after a predetermined period of inactivity or upon user input to start a trip. A trip end location is set at step 304. For example, the trip end location may be automatically set as the GPS location at the time of trip start. Alternatively, the trip end location may be set by a user, such as a default "home" location or a trip-specific end destination location. For example, the trip end location may be set by a user via the display 40 or another user interface device, such as a mobile device, communicating with the control system 11.

One or more environmental vectors are then identified at step 306. For example, the environmental vector(s) may include a wind vector describing a magnitude and direction of wind in an area around the marine vessel or an area (e.g., defined based on GPS) through which the vessel has or will travel. Alternatively or additionally, the environmental vector(s) may include a current vector describing a magnitude and direction of water current in an area around the marine vessel or an area through which the vessel has or will travel.

A path is then defined at step 308 from the vessel's present GPS location to the trip end location. The path includes a path distance and path direction, such as defining the shortest water-based path between the present vessel location and the trip end location.

A required battery power is then calculated at step 310, which is the amount of power required to get the marine vessel from the present vessel location to the trip end location according to the path accounting for the environmental vectors. For example, the required battery power may be calculated assuming that a current speed parameter of the vessel is maintained. Alternatively, the required battery power may be calculated based on a fixed speed parameter assumption, such as assuming a fixed vessel speed or motor speed representing a reasonable average speed for the propulsion device. An exemplary calculation method for determining the required battery power is illustrated below.

The required battery power is compared to the current battery charge level at step 312. For example, the comparison may be conducted to monitor that the battery charge level is sufficiently greater than the required battery power and advise a user accordingly. For example, the control system 11 may be configured to determine whether the battery has sufficient power to safely cover the remainder of the trip. For example, the control system may determine whether the required battery power is at least a threshold less than the current battery charge level, wherein the threshold value is calibrated to provide a safety margin to account for unexpected environmental factors, the user taking an indirect route home, traveling faster than the assumed speed parameter, etc.

A battery range notice is generated at step 314 based on the battery range assessment and comparison to the current battery charge level. For example, the battery range notice may be configured to guide a user on reserving sufficient power to complete the trip to the end location, accounting for wind, current, waves, etc. For example, the battery range notice may include a distance to empty and/or a time to empty for the vessel traveling in the path direction—i.e., indicating and/or quantifying how far and long the vessel can travel in the path direction toward home. For instance, the battery range notice may include an indicator, such as a color indicator, advising a user whether they have sufficient battery power to get back to the end location. The indicator may be green when there is more than enough battery power to reach the end location, yellow when the required power is within a first threshold of the current battery charge level, and red when the required power becomes less than a second threshold away from the current battery charge level-thus indicating that the user is risking running out of battery power prior to reaching the end location. Alternatively or additionally, the battery range notice may be configured to advise a user of a turnaround location, such as a furthest distance in the vessel's current heading location that the vessel can travel away from the end location before needing to turn around and head home.

The following illustrates an exemplary method of calculating the required battery power. The drag on the vessel is determined based on the environmental vector(s), such as based on a wind vector and/or a current vector. The method compensates for the drag when the vessel returns home or changes direction, thus accounting for the environmental factors in the range estimation.

Figure 7:
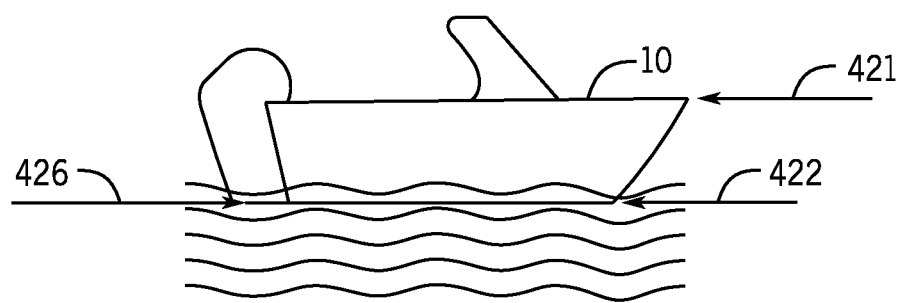
FIGS. 7 and 8 are diagrams illustrating force vectors and vessel area for calculating the drag of a marine vessel as part of the required battery power calculation.
Figure 8:
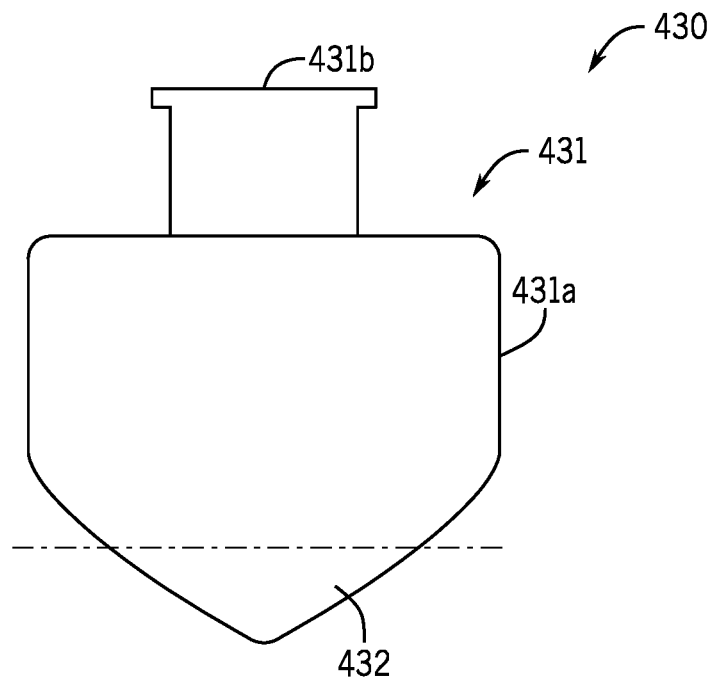

FIGS. 7 and 8 illustrate force vectors and vessel area for calculating the drag of a marine vessel for determining the required battery power. FIG. 7 illustrates the air resistance vector 421 and the water resistance vector 422, which are forces opposing the thrust vector 426 representing the propulsion force generated by the marine drive(s). FIG. 8 illustrates the total cross-sectional area 430 of the vessel 1. A portion of the cross-section area is in air, the area in air 431, and a portion is in the water, the area in water 432. The area in air 431 includes the hull cross-sectional area 431*a* and a top area 431*b* that includes things like the helm housing (e.g., the helm console and windshield), the bimini top or other coverings, etc. The air resistance vector 421 is applied to the area in air 431 and the water resistance vector 422 is applied to the area in water 432. When the vessel is at a steady state velocity, the total force from the air and water resistance vectors 421 and 422 on the area in air 431 and the area in water 432, respectively, are equal to the propulsion thrust vector 426.

An area of the vessel in air is identified, which is an instantaneous area value calculated based on a vessel speed parameter (such as RPM or vessel speed). In some embodiments, the instantaneous area in air may also be calculated to account for trim position of the marine drive(s) and/or a measured vessel pitch. A frontal area in air 431 may be determined based on the vessel speed to identify a portion of the total frontal area that is out of the water at the given vessel speed. Namely, the area in air 431 will be greater and the area in water 432 will be less when the vessel is on plane than when it is off plane, and thus the division of the total cross-sectional frontal area 430 into the two areas 431 and 432 is vessel speed dependent. The total frontal area 430 may be defined as a configuration setting, for example, defined upon setup or registration of the electric propulsion system or marine drive to a particular vessel. Alternatively, as explained further below, the total frontal area may be determined based on vessel hull parameters and/or based on current operational parameters. For example, the total frontal area value may be based on trim position of the marine drive(s) and/or a measured vessel pitch. Once the area in air 431 is found, it is held constant until the vessel speed changes.

The instantaneous area in air 431 may be calculated according to the following:

$$A_{air\,true} =$$

$$\frac{Torque * PropEfficiency * Speed\left(\dfrac{Rad}{s}\right) -}{Cdw * WaterDensity * WaterVelocity^3 * FrontalArea}{Cdair * AirDensity * AirVelocity^3 - Cdw * WaterDensity * WaterVelocity^\wedge 3}$$

Wherein the instantaneous air equation is derived by combining the following sets of equations corresponding to the resistance and thrust forces:

$$Power = \frac{Thrust *}{Velocity} = \frac{Torque *}{MotorSpeed *}{n\_prop} = \frac{Current *}{Voltage *}{n\_prop *}{n\_elec} = \xrightarrow{\begin{array}{c}Air\ Resistance\ Power = Cd * Density\ Air * \\ Velocity\ Air^\wedge 3 * Frontal\ Area\ In\ Air\end{array} \quad \begin{array}{c}Water\ Resistance\ Power = Cd * Density\ Water * \\ Velocity\ Water^\wedge 3 * Frontal\ Area\ In\ Water\end{array}}$$

The density of water and air are known, wherein the density of water may be assigned as 1,000 $kg/m^3$ and the density of air may be assigned as 1 $kg/m^3$. The velocity of air may be determined as the speed over ground plus the measured air speed (or air speed obtained from another source). The velocity of water may be determined as the speed over ground (such as GPS speed) plus the measured water speed (or water speed obtained from another source).

The drag coefficients for water and air and the total frontal area to be utilized in the instantons area in air calculation may be determined by various means or may be preset values utilized by the control system. For example, the drag coefficients Cdair and Cdw may be set or identified based on hull parameters of the marine vessel—such as hull type, vessel length, vessel width, and/or vessel weight. The drag coefficients and area values may be set at the time of system configuration, or the control system may be configured to automatically set the values based on user input or based on the registration of the propulsion system to a particular vessel. In some embodiments, the drag coefficients Cdair and Cdw are accessed and/or identified by the control system based on the registration of the marine drive(s) to a particular vessel—i.e., based on the registered vessel's hull dimensions and hull shape. Based on that information, or on user input of similar information, the control system may access a lookup table of drag coefficients and/or frontal area values based on vessel type, size, make/model, etc.

Alternatively, the control system may store a set of drag coefficients for water and air and the total frontal area (such as a value sets identified based on vessel type and length, as described above). The drag coefficients utilized for coefficients Cdair and Cdw and the total frontal area may then be determined based on operational parameters at the time of calculation, such as based on a current speed parameter (e.g., vessel speed, ROM, current, torque, etc.), a current trim position (such as a current commanded trim position or a sensed trim position), and/or a vessel pitch (such as measured by an IMU or other sensor capable of measuring vessel pitch). For example, the control system may store and access a table of Cdair and Cdw and/or total frontal area values based on speed parameter values and vessel pitch values, or based on speed parameter values and trim position values. Given that the total frontal area of the vessel will change based on vessel pitch angle, and thus based also on trim, the frontal area value may be adjusted to account for pitch or trim position. In the case of pitch, the control system may determine a filtered pitch value (such as a first order filtered value of pitch measurements over a predetermined time).

Once the area in air is found, the battery power that would be required for a given air velocity and water velocity (required battery power) can be determined based on the known propeller efficiency and electrical efficiency values for the particular propulsion system and via the following equation:

$$Cdair*AirDensity*AirVelocity^3 - \\ Cdw*WaterDensity*WaterVelocity^3*A_{air,inst} + \\ Cdw*WaterDensity*WaterVelocity^3*FrontalArea = Battery \\ Power*PropEfficiency*ElectricalEfficiency$$

The electrical efficiency is the losses going from battery power (Current*Voltage) to shaft power (Torque*MotorSpeed) and the prop efficiency is the losses going from shaft power to propulsive power (Thrust*velocity). The efficiency values may be identified via testing and populated into calibration look-up tables based on speed and torque.

The battery range is then calculated, which can take on various values, and a user is notified accordingly. For example, the battery range calculation may include a determination of the total time remaining, or time to empty, which may be calculated as follows:

$$EastVelocityReturn = Velocity * \sin(\theta\_return)$$

$$SouthVelocityReturn = Velocity * \cos(\theta\_return)$$

$$EastAirVelocityReturn = EastVelocityReturn + EastWind$$

$$SouthAirVelocityReturn = SouthVelocityReturn - NorthWind$$

$$AirVelocityReturn = \sqrt{EastAirVelocityReturn^2 + SouthAirVelocityReturn^\wedge 2}$$

$$\frac{PowerReturn * DistanceReturn}{VelocityReturn} = kWhr\ Return$$

$$Time\ Remaining = \\ \frac{(Battery\ capacity\ Remaining - kWhr\ Return)}{Current\ Power} + \frac{Distance\ Return}{Velocity}$$

The distance to return is the GPS distance between the vessel's present GPS location and the end location (also defined as a GPS location). The power to return is found by adjusting the air velocity and water velocity inputs from the above equation. The velocity inputs are adjusted by accounting for the wind direction/magnitude and or the current direction and magnitude relative to the vessel heading required to return home. Thereby, the system can dynamically solve for the time remaining at the current vessel speed assuming the driver is going maintain that vessel speed for the duration of the path to the end location. The distance remaining, or distance to empty, on the path to the end location can then be determined by multiplying the time remaining by the vessel's speed over ground.

This written description uses examples to disclose the invention, including the best mode, and to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of monitoring battery range for a power storage system powering at least one marine drive on a marine vessel, the method comprising:

sensing a wind speed with a wind speed sensor on the marine vessel, sensing a water speed with a water speed sensor on the marine vessel, and/or sensing a current location of the marine vessel with a GPS;

with a controller on the marine vessel:

identifying at least one environmental vector describing a magnitude and a direction of an environmental factor impacting the marine vessel based on the sensed wind speed, the sensed water speed, and/or the sensed current location;

determining a path distance and a path direction from the current location of the marine vessel to a trip end location;

calculating a required battery power for operating the at least one marine drive to propel the vessel the path distance and the path direction based on the environmental vector;

comparing the required battery power to a current battery charge level of the power storage system powering the at least one marine drive; and controlling a user interface to generate a battery range notice based on a difference between the required battery power and the current battery charge level.

2. The method of claim 1, wherein the required battery power is calculated further based on a current speed parameter of the marine vessel, wherein the current speed parameter is at least one of a speed over water of the marine vessel, a speed over ground of the marine vessel, a motor speed, or a motor current.

3. The method of claim 1, wherein the at least one environmental vector includes a wind vector describing a magnitude and a direction of the wind in an area around the marine vessel.

4. The method of claim 1, wherein the at least one environmental vector includes a current vector describing a magnitude and a direction of water current in an area around the marine vessel.

5. The method of claim 1, wherein the trip end location is automatically set equal to a start location of the trip.

6. The method of claim 1, wherein the trip end location is a location set by a user.

7. The method of claim 1, wherein the path distance and the path direction are determined as the most direct path for the marine vessel from the current location of the marine vessel to the trip end location.

8. The method of claim 1, further comprising:

determining a turnaround point based on the difference between the required battery power and the current battery charge level; and generating an alert advising a user of the turnaround point.

9. The method of claim 8, wherein the turnaround point is further based on a current heading and a current speed parameter of the marine vessel.

10. The method of claim 8, wherein the turnaround point is determined as the location in a current heading direction of the marine vessel where the required battery power is a threshold less than the current battery charge level.

11. The method of claim 8, further comprising, within a threshold distance of the turnaround point, determining that the marine vessel is not heading toward the trip end location, and wherein the alert advises the user to turn the marine vessel toward the trip end location at or before the turnaround point.

12. The method of claim 1, further comprising calculating a drag of the marine vessel based on the at least one environmental vector and calculating the required battery power based on the drag.

13. The method of claim 12, wherein calculating the drag of the marine vessel includes calculating at least one of wind drag based on an area of the vessel in air and a current drag based on an area of the vessel in water.

14. The method of claim 1, wherein identifying the at least one environmental vector includes measuring at least one of the wind speed via the wind speed sensor on the marine vessel and the water speed via the water speed sensor on the marine vessel, and calculating the at least one environmental vector based on the measured water speed and/or the measured wind speed.

15. The method of claim 1, wherein identifying the at least one environmental vector includes accessing a map of current vectors and/or wind vectors based on the current location of the marine vessel and/or at least one GPS location between the current location and the trip end location.

16. The method of claim 1, wherein the battery range notice includes a distance to empty on the path to the end location or a time to empty on the path to the end location for the marine vessel traveling in the path direction.

17. A marine propulsion system comprising:

a power storage system powering at least one marine drive on a marine vessel;

a control system configured to:

identify at least one environmental vector describing a magnitude and a direction of an environmental factor impacting the marine vessel, wherein the environmental factor includes at least one of wind or current;

determine a path distance and a path direction from a present location of the marine vessel to a trip end location;

calculate a required battery power for operating the at least one marine drive to propel the vessel the path distance and the path direction based on the environmental vector;

compare the required battery power to a current battery charge level of the power storage system powering the at least one marine drive; and generate a battery range notice based on a difference between the required battery power and the current battery charge level.

18. The system of claim 17, wherein the control system is configured to calculate the required battery power further based on a current speed parameter of the marine vessel, wherein the current speed parameter is at least one of a speed over water of the marine vessel, a speed over ground of the marine vessel, a motor speed, or a motor current.

19. The system of claim 17, wherein the at least one environmental vector includes a wind vector describing a magnitude and a direction of wind in an area around the marine vessel.

20. The system of claim 17, wherein the at least one environmental vector includes a current vector describing a magnitude and a direction of water current in an area around the marine vessel.

21. The system of claim 17, wherein the control system is further configured to determine the path distance and the path direction as the most direct path for the marine vessel from the present location of the marine vessel to the trip end location.

22. The system of claim 17, wherein the control system is further configured to calculate a drag of the marine vessel based on the at least one environmental vector and calculate the required battery power based on the drag, wherein calculating the drag of the marine vessel includes calculating at least one of wind drag based on an area of the vessel in air and a current drag based on an area of the vessel in water.

23. The system of claim 17, wherein the control system is further configured to identify the at least one environmental vector by accessing a map of current vectors and/or wind vectors based on at least a current GPS location of the marine vessel and/or at least one GPS location between the current GPS location and the trip end location.

\* \* \* \* \*